(12) United States Patent
Shihada et al.

(10) Patent No.: US 9,276,832 B2
(45) Date of Patent: Mar. 1, 2016

(54) BUFFER SIZING FOR MULTI-HOP NETWORKS

(71) Applicant: King Abdullah University of Science and Technology, Thuwal (SA)

(72) Inventors: Basem Shihada, Thuwal (SA); Ahmad Showail, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 116 days.

(21) Appl. No.: 14/166,262

(22) Filed: Jan. 28, 2014

(65) Prior Publication Data

US 2014/0140209 A1    May 22, 2014

Related U.S. Application Data

(63) Continuation-in-part of application No. 13/226,100, filed on Sep. 6, 2011, now Pat. No. 8,638,686.

(60) Provisional application No. 61/454,536, filed on Mar. 20, 2011.

(51) Int. Cl.
| | |
|---|---|
| *H04W 4/00* | (2009.01) |
| *H04L 12/26* | (2006.01) |
| *H04L 12/861* | (2013.01) |
| *H04L 12/835* | (2013.01) |
| *H04L 12/801* | (2013.01) |
| *H04L 12/805* | (2013.01) |

(52) U.S. Cl.
CPC ............ *H04L 43/0864* (2013.01); *H04L 47/17* (2013.01); *H04L 47/30* (2013.01); *H04L 49/9005* (2013.01); *H04L 47/12* (2013.01); *H04L 47/14* (2013.01); *H04L 47/36* (2013.01)

(58) Field of Classification Search
None
See application file for complete search history.

(56) References Cited

U.S. PATENT DOCUMENTS

| | | | |
|---|---|---|---|
| 8,634,300 B2* | 1/2014 | Tan et al. ....................... 370/235 |
| 2009/0063804 A1* | 3/2009 | Trainin ................. H04L 1/1621 711/170 |
| 2009/0303871 A1* | 12/2009 | Kim ...................... H04L 1/1877 370/216 |
| 2010/0098047 A1* | 4/2010 | Zhou et al. ..................... 370/345 |
| 2010/0329117 A1* | 12/2010 | Lee et al. ...................... 370/235 |
| 2012/0163385 A1* | 6/2012 | Lee et al. ...................... 370/392 |
| 2013/0083654 A1* | 4/2013 | Lee et al. ...................... 370/230 |
| 2014/0112322 A1* | 4/2014 | Ram ................... H04W 28/065 370/338 |
| 2014/0241163 A1* | 8/2014 | Lee et al. ...................... 370/235 |

* cited by examiner

*Primary Examiner* — Anh-Vu Ly
(74) *Attorney, Agent, or Firm* — Steptoe & Johnson LLP

(57) ABSTRACT

A wireless network node can include a wireless network antenna, a processor in communication with the wireless network antenna, and a non-transitory computer readable medium containing computer-executable code. The processor can be configured to calculate an initial buffer size. The processor can be configured to adjust the initial buffer size to a current buffer size based on a current network load.

23 Claims, 10 Drawing Sheets

BUFFER SIZING FOR MULTI-HOP NETWORKS

CROSS-REFERENCE TO RELATED APPLICATION

This application is a continuation-in-part of U.S. Nonprovisional patent application Ser. No. 13/226,100, filed Sep. 6, 2011, which claims priority to U.S. Provisional Patent Application No. 61/454,536 filed on Mar. 20, 2011, the entire contents of which are specifically incorporated by reference herein without disclaimer.

TECHNICAL FIELD

This invention relates to networks and more particularly relates to buffering of data when routing data in networks.

BACKGROUND

Wireless mesh networks (WMNs) are a type of ad hoc wireless networks that uses multi-hop wireless communications to provide or improve connectivity between mesh routers. The mesh routers may be mobile or stationary. Client devices may connect to their preferred mesh router using wired or wireless technologies. The client traffic is then routed across the mesh from mesh router to mesh router to reach another device within the mesh. Alternatively, the client traffic is routed to an external device accessible via a gateway mesh router that bridges traffic between the WMN and an external network. Client devices may roam between different mesh routers in a network, and as such, their mobility management may be performed as a part of the WMN framework.

The broadcast nature of the shared wireless channel limits the set of wireless nodes that can transmit concurrently. One differentiator between various wireless technologies is the medium access control (MAC) protocol, which controls and coordinates access to the shared wireless spectrum. Distributed wireless nodes often use a carrier sense multiple access with collision avoidance (CSMA/CA) MAC protocol. The IEEE 802.11 family of standards is a popular implementation of CSMA/CA. Wi-Fi radios supporting these standards have become a commodity that may be operated globally in license-exempt frequency bands. The IEEE 802.11 standard also supports ad hoc communication capabilities that may be used to set up WMNs. Amendments under the IEEE 802.11s standard introduce mesh capabilities for multi-hop forwarding at layer two in the network.

A buffer is a temporary storage for information bits. Packet-switched networks implement buffers to accommodate transient traffic bursts. Buffers may prevent packet loss. Buffer sizing is an important network configuration parameter: under-buffered networks lead to frequent packet loss and subsequent under-utilization of network resources, and over-buffered networks lead to increased queuing delays.

Transmission control protocol/internet protocol (TCP/IP) communications are used by a large number of network applications, such as file transfers. TCP provides reliable, in-order delivery of data. TCP uses acknowledgments (ACKs) with retransmissions to provide reliable packet delivery. A sliding window mechanism is provided in TCP for flow control and congestion control. Network capacity information may be determined by adjusting the size of its sliding window (called congestion window). TCP implements an additive increase, multiplicative decrease (AIMD) mechanism to adjust the size of its congestion window in response to network feedback. Thus, TCP operates as a closed-loop feedback system. The TCP congestion control algorithms depend on tight control loops, meaning that there are no substantial queuing delays in the network.

User datagram protocol (UDP) communications are increasingly being used by applications that value timely delivery of data over reliable delivery. These include delay-sensitive applications such as voice over IP (VoIP), gaming, and real-time video broadcast. Usually the application fills in gaps where data is either delayed, lost, or corrupted during its transmission through the network. Thus, minimizing queuing delays is an important performance metric for UDP traffic as the queuing delay contributes to the perceived quality of service (QoS) at the application layer.

A data flow or a data stream is a sequence of data packets (e.g., TCP segments or UDP packets) between two hosts. A flow in IP networks may be identified by a multi-tuple key. One conventional definition of flow uses a 5-tuple key, including source IP address, destination IP address, protocol (e.g., TCP, UDP, ICMP), source port, and destination port. A flow may traverse multiple links (with possibly heterogeneous link capacities) along the path between the source and destination. The end-to-end rate of this flow is limited by the link with the smallest available capacity along this path. That link becomes the bottleneck for this flow.

With declining memory chip prices, system architects may be inclined to over-provision routing buffers. This, however, does not necessarily lead to improved network performance. IP networks, in general, desire to minimize buffering and queuing delays. While this is apparent for real-time flows, it also holds for scenarios where throughput has precedence over delay (e.g., bulk file transfer with TCP). TCP's AIMD rate control algorithm is designed to fill any buffer and invoke an occasional packet loss so as to provide feedback to the sender. Large network buffers increase the delay before this congestion information can be communicated to the TCP source. This may have a number of ramifications: first, it may affect the stability characteristics of the TCP stream, and second, it may impact the delay characteristics for other flows (both real-time and TCP) sharing the buffer with this stream.

A conventional buffer sizing approach used in wired networks is to size the bottleneck link buffers to be greater than the bandwidth delay product (BDP) of the network, such that $B \geq C \times RTT$, where B is the bottleneck link buffer, C is the bottleneck link capacity, and RTT is the effective round-trip propagation delay through the bottleneck. BDP represents the maximum carrying capacity of the path between the source and the destination. Because queues in wired networks only build up at bottleneck links, buffer sizing is of minimal concern at other locations in the wired network.

The wireless domain introduces a number of new challenges in understanding the impact of buffer size on network performance. In a wired network, buffer sizing is usually studied by keeping the bottleneck link fully utilized. Wireless links, however, are just an abstraction for shared spectrum between communicating entities and their neighbors, only one of which can successfully transmit at a time. It is not clear how buffers may be associated with a distributed set of nodes, some of which relay traffic for other nodes in the network. Furthermore, the capacity of this shared spectrum is not a known constant, but varies over time due to sporadic noise and interference from other wireless nodes. Finally, for the popular CSMA/CA networks, the packet inter-service time at each transmission hop varies due to the random scheduling by the MAC. This MAC behavior should be accounted for when designing buffer sizing protocols for wireless networks.

SUMMARY

In an aspect, a wireless network node can include a wireless network antenna, a processor in communication with the wireless network antenna, and a non-transitory computer readable medium containing computer-executable code. The processor can be configured to calculate an initial buffer size. The processor can be configured to adjust the initial buffer size to a current buffer size based on a current network load.

In some embodiments, the wireless network node can determine a bandwidth delay product. The bandwidth delay product can be based on an effective round-trip delay. The initial buffer size can be greater than or equal to a determined bandwidth delay product of the bottleneck link capacity.

In other embodiments, the wireless network node can have a transmission rate. The initial buffer size can be the multiplicative product of the transmission rate and a round-trip delay for a single protocol data unit transmission. The processor can further be configured to determine a queue drain time. The processor can further be configured to calculate a predefined maximum queue drain time and a predefined minimum queue drain time. The processor can further be configured to readjust the current buffer size. The readjustment can be based on a determination that the queue drain time is outside the range defined by the maximum queue drain time and the predefined minimum queue drain time. The processor can further be configured to readjust the current buffer size when the queue drain time is outside the range for at least two consecutive periods.

In another aspect, a method of managing wireless queues can include calculating an initial buffer size based on a round-trip delay for a single protocol data unit transmission and a transmission rate. The method can include adjusting the initial buffer size to a current buffer size based on a current network load.

In some embodiments, the initial buffer size can be greater than or equal to a determined bandwidth delay product of the bottleneck link capacity. The method can further include determining a queue drain time. The method can further include calculating a predefined maximum queue drain time and a predefined minimum queue drain time. The method can further include readjusting the current buffer size based on a determination that the queue drain time is greater than the maximum queue drain time or less than the predefined minimum queue drain time for at least two consecutive periods.

In another aspect, a method for managing wireless queues can include setting a maximum acceptable queuing delay limit, calculating an initial queue size, $Q_{initial}$, and calculating a current queue size, Q. The initial queue size, $Q_{initial}$, can be based on a current transmission rate, R, and the round trip delay for a single protocol data unit transmission, ARTT. The initial queue size can conform with the relationship: $Q_{initial}=R*ARTT$.

In some embodiments, the method can further include periodically calculating a queue drain time, $T_{drain}$, in a channel based on the total number of bits in the current queue size, B, and the percentage of time the channel is not busy, F. The queue drain time can conform to the relationship:

$$T_{drain} = \frac{B/R}{F}.$$

The method can further include adjusting Q based on whether the network is bloated.

In an aspect, a method can include identifying a set of bottleneck nodes in a wireless mesh network. The method can also include calculating a cumulative buffer size for the set of bottleneck nodes. The method can further include distributing this cumulative buffer size between the set of bottleneck nodes.

In one embodiment, the computer program product includes a non-transitory computer readable medium having code to identifying a set of bottleneck nodes in a wireless mesh network. The medium also includes code to calculate a cumulative buffer size. The medium further includes code to distribute the cumulative buffer size between the set of bottleneck nodes.

In one embodiment, the system includes a plurality of nodes in a wireless mesh network, each of the plurality of nodes having a buffer and a processor. The system also includes a plurality of communications links coupling the plurality of nodes, each communications link coupling two of the plurality of nodes, in which at least two of the plurality of communications links share resources. The system further includes an interference domain comprising at least two of the plurality of communications links that share resources, the interference domain having a cumulative buffer defined. The processor of at least one of the plurality of nodes is configured to calculate a size for the cumulative buffer. The processor is also configured to distribute the cumulative buffer size between the plurality of nodes corresponding to at least two communications links in the interference domain.

In another embodiment, the method includes providing a plurality of nodes in a wireless network compatible with at least one wireless network standard. Each of the plurality of nodes has a buffer with an initial assigned size. The method also includes actively measuring at least one link characteristics and network load. The method further includes adaptively adjusting buffer size of each node based on the measured link characteristics and network load.

In another embodiment, the non-transitory computer readable medium has code to identify a plurality of nodes in a wireless network compatible with at least one wireless network standard. The medium also includes code to actively measure at least one link characteristics and network load. The medium further includes code to adaptively adjust buffer size of each node based on the measured link characteristics and network load.

In another embodiment, the system includes a plurality of nodes in a wireless network compatible with at least one wireless network standard. Each of the plurality of nodes has a buffer with initial assigned size and a processor. The processor of at least one of the plurality of nodes is configured to actively measure at least one link characteristics and network load and to adaptively adjust buffer size of each node based on the measured link characteristics and network load. The term "coupled" is defined as connected, although not necessarily directly, and not necessarily mechanically.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

Other aspects, embodiments, and features will be apparent from the following description, the drawings, and the claims.

DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
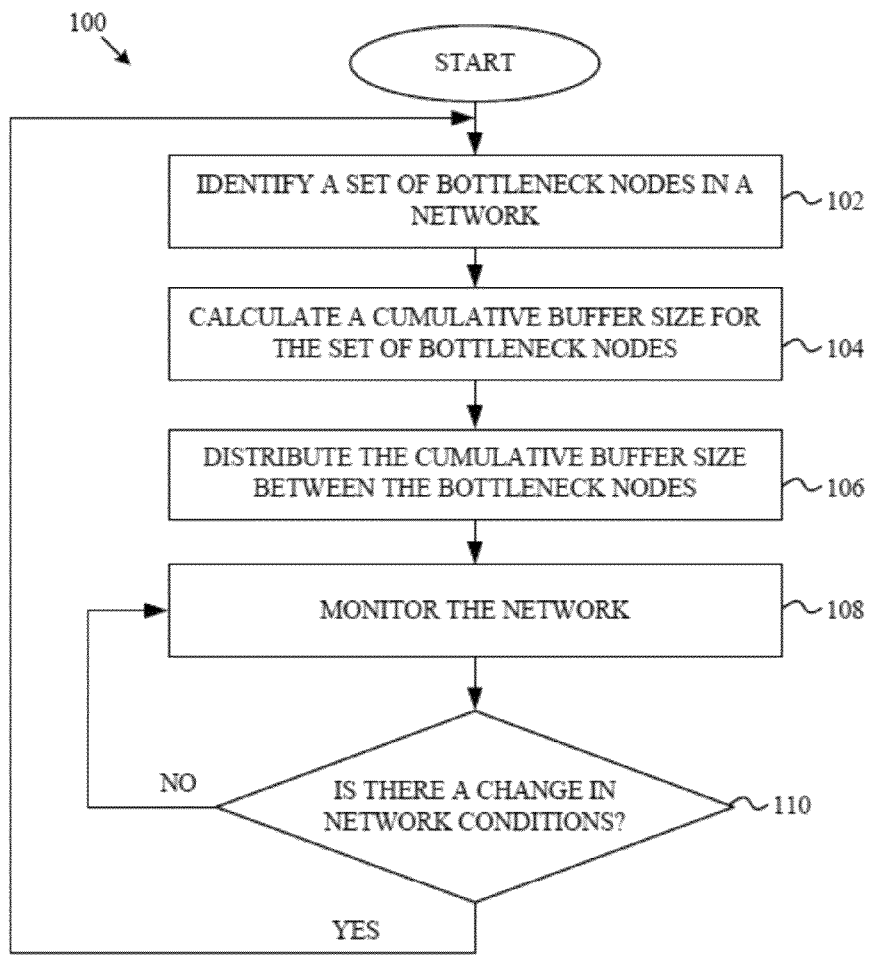
FIG. 1 is a flow chart illustrating a method of assigning a cumulative buffer according to one embodiment of the disclosure.

A detailed explanation of the system and method according to the preferred embodiments of the present invention are described below.

As one skilled in the art will appreciate, embodiments of the present invention may be embodied as, among other things: a method, an apparatus, a system, or computer-program products. Accordingly, the embodiments may take the form of a hardware embodiment, a software embodiment, or an embodiment combining software and hardware. The present invention can take the form of a computer-program product that includes computer-useable instructions embodied on one or more computer-readable media. Some terms, such as transducer and transceiver, or transmitter, sensor, and microsensor can have overlapping meanings and describe overlapping or equivalent technologies or products, and therefore, may be used interchangeably. Such terms are intended to invoke their specific meaning and their general meaning, as well as any overlapping or equivalent meanings, technologies or products.

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

A buffer sizing mechanism may improve the throughput of a network data stream and minimize the queuing delay. In contrast with wired networks, which are concerned with sizing the buffer along the bottleneck link, a buffer sizing mechanism for wireless mesh networks may size a "cumulative" buffer for a set of bottleneck nodes that limit the end-to-end rate of a multi-hop flow. The bottleneck nodes may be a set of nodes sharing a common spectrum, such that the common spectrum limits the end-to-end data rate. A packet transmission by any of the bottleneck nodes may fully utilize the bottleneck spectral resource for the duration of this transmission.

Buffering just enough packets to keep the bottleneck spectrum fully utilized allows operation of the flow at high end-to-end data rates and minimization of queuing delay along links in the wireless mesh network. The collective buffer of the neighboring nodes sharing the bottleneck spectrum is referred to as the cumulative buffer. According to one embodiment, a cumulative buffer size may be set to the bandwidth delay product (BDP) of a path to the destination through the bottleneck nodes. To account for sporadic interference in wireless channel and random scheduling of carrier sense multiple access with collision avoidance (CSMA/CA) MAC, one embodiment of this invention may simply compute and implement an upper bound on BDP. Once the cumulative buffer size is determined, the buffer may be distributed among the set of nodes constituting the bottleneck. This allocation may be accomplished in multiple ways including, for example, equal distribution amongst the nodes. In another example, the buffer may be distributed through the use of a cost function that decreases the probability of packet drop based on the number of hops already traversed by the packet. Such a technique assigns a higher cost for dropping packets that have consumed a larger portion of network resources.

Measurement studies have uncovered significant over-buffering in data networks. While big buffers can potentially increase throughput by, e.g., limiting packet drops, large queues can result in high latency. This phenomenon of bufferbloat, see J. Gettys and K. Nichols, "Bufferbloat: dark buffers in the internet," *Commun. ACM*, vol. 55, no. 1, pp. 57-65, January 2012, which is incorporated by reference in its entirety, can create delays up to orders of seconds. With falling memory prices and the perception that more is better, performance degradation from large buffers can be observed in many networking devices, including end-user equipment such as DSL, cable routers or wireless Access Points (APs).

Addressing bufferbloat in wireless devices, such as APs, can be a significant challenge. For example, the wireless link capacity is not fixed. Wireless devices can use a rate control algorithm to select their transmission rate based on several variables, such as the distance between the transmitter and the receiver and the channel noise floor. For example, IEEE 802.11n link rate can vary from 6.5 Mb/s to 600 Mb/s. With over two orders of magnitude variation in link rate, using a fixed buffer size can significantly degrade the network performance. As another example, wireless can be a shared medium and hence wireless link scheduling is not independent. Thus, a node's share of the wireless channel can depend on other wireless nodes in the neighborhood that are also contending for channel access. As a result, the usable link capacity is often much smaller than the physical link rate. This can also affect the amount of buffering needed in the network. Inter-service rate for a wireless packet transmission can vary, since, e.g., packets may need to be retransmitted, sometimes multiple times, before they reach their destination.

New enhancements in wireless standards, such as frame aggregation in the 802.11n standard, can further complicate the problem of choosing the optimal queue size in wireless networks. Large buffers can lead to long end-to-end delays in the order of seconds. A practical, adaptive, and lightweight queue management scheme called WQM is described and illustrated herein. It can choose the queue size based on, e.g., network load and channel conditions. WQM can reduce end-to-end latency by factors of at least 5× to 6× with a cost of around 10% reduction in throughput compared to default Linux configurations. Further, WQM can improve network fairness, for example by limiting the ability of a single flow to saturate the buffers.

Figure 7:
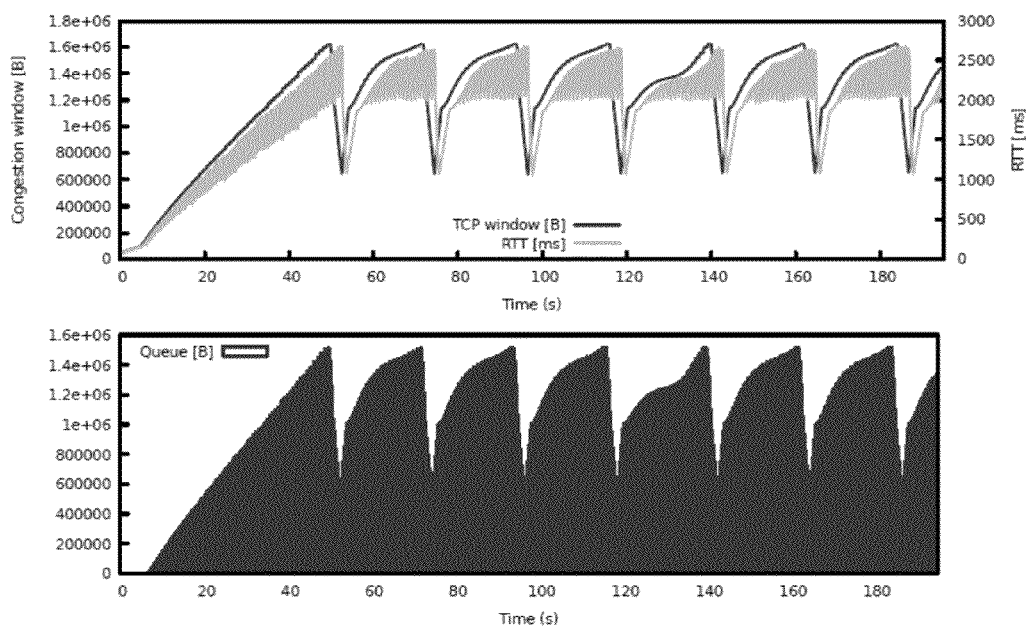
FIG. 7 depicts a TCP congestion window, RTT, and egress queue utilization with a one-hop TCP flow in a 802.11n wireless testbed with 6.5 Mb/s link rate. Buffer size corresponds to values in the stock Linux kernel.

FIG. 7 highlights the impact large buffers can have on network performance. A large file has been transferred between two 802.11n wireless hosts connected via a 6.5 Mb/s wireless link. This low link rate can be used to emulate an environment with high interference. FIG. 7 shows a TCP congestion window, round trip time (RTT), and egress buffer occupancy for the sender using a default Linux buffer size of 1000 packets. Single file transfer with such a large buffer can result in long queuing delays, with RTT values exceeding 2 seconds.

802.11n standard specifications introduced MAC-layer frame aggregation to improve network performance. Using Aggregate MAC Protocol Data Unit aggregation (A-MPDU), a wireless node can transmit up to 64 MPDUs or subframes. The aggregation logic or scheduler is left open to the vendor's implementation. Always transmitting a maximum sized A-MPDU may maximize throughput, but this will increase delays if a node needs to wait to assemble 64 MPDUs from higher layers. In contrast, some Linux implementations send as many frames as currently available in the buffers, resulting in A-MPDUs with variable frame sizes. This variability in frame size can pose a new challenge to accurately estimate the queue draining time based on the current transmission rate. Other enhancements in 802.11n, such as channel bonding and MIMO streams, can allow 802.11n radios to operate at link rates as high as 600 Mb/s. Thus, there is a huge variation in the queue draining time between the highest and lowest possible rates. For example, assuming a single sender and receiver, both configured with a conventional buffer size of 1000 packets, a 600 Mb/s link needs only 20 ms to empty the buffer. However, this buffer drain time is two orders of magnitude higher for a 6.5 Mb/s link.

Figure 8:
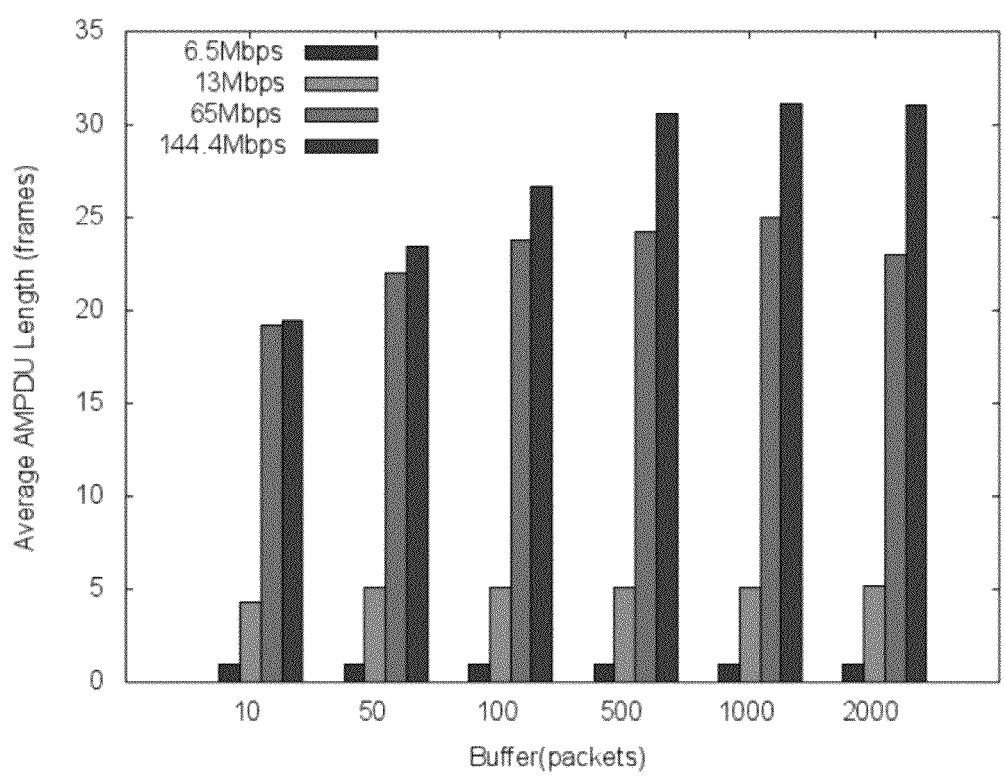
FIG. 8 depicts average A-MPDU length over a large file transfer while varying both link rates and queue sizes.

IEEE 802.11n and 802.11ac standards include several enhancements, including frame aggregation. Two types of aggregation are supported: A-MPDU and A-MSDU. The former simply means sending several IP packets back-to-back after assigning a MAC header for each one of them. On the other hand, the latter packs multiple IP packets into one MAC frame with the support of the host software side. It is worth noting that A-MPDU can aggregate several A-MSDUs. An important difference between these two aggregation methods is the support of QoS traffic classes. A-MPDU subframes may belong to various traffic classes. Alternatively, all the subframes in an A-MSDU must belong to the same traffic class. As A-MSDU aggregation is not implemented in Linux wireless drivers yet, embodiments herein are described with respect to A-MPDU aggregation for convenience. The maximum size of an A-MPDU aggregate in 802.11n is 64 KB where 802.11ac is capable of sending aggregates as big as 1 MB. Hence, the constant use of extremely small buffers will be infeasible. Another major difference between aggregation in 802.11n and 802.11ac is the fact that the latter always sends frames as aggregates even if the sender has only a single frame to send. To understand the relation between buffer sizing and A-MPDU length, the transmission rate can be fixed and the A-MPDU length over a large file transfer between two nodes can be monitored while varying the queue size after each run. FIG. 8 shows that higher transmission rates and bigger buffers can allow the sender to send longer A-AMDUs. It also shows that any 802.11n device is not going to always send with a maximum A-MPDU size.

While some disclosed examples in herein describe bursty and real-time traffic sent over wireless mesh networks (WMNs), such as ad hoc 802.11 networks, the embodiments described may be applied to other multi-hop wireless network technologies, including other CSMA/CA radio platforms and technologies.

To address some of the challenges, a wireless queuing management (WQM) has been designed and implemented for networks. WQM can identify and distinguish between "good" and "bad" buffers. Good buffers can be considered buffers needed to absorb bursty traffic, while bad buffers only contribute to network latency without any noticeable improvement in throughput. WQM can be both practical and incrementally deployable. It can use existing data traffic as probe for network measurements and need not incur any additional overhead. To account for channel variability, WQM can periodically recalculate the time needed to drain the buffer based on, for example, current transmission rates. It can then adjust the buffer size to maintain the network quality of service (QoS) guarantees, reducing queuing delays where necessary, while allowing sufficient buffers to saturate available network capacity. Further, WQM can incorporate MAC behavior, such as A-MPDU frame aggregation, for example to get accurate estimates of queue draining time. WQM can be implemented across platforms and operating systems. In a preferred embodiment, WQM can be implemented in a Linux environment, and it can reduce end-to-end delay by up to at least six times with a slight drop in network throughput when compared to the typical queue sizes used in some operating systems such as various Linux distributions. WQM can be more practical as it need not involve time-stamping the packets at their arrival to the queue. It also can account for the MAC-layer behavior when deciding about the optimal queue size.

Figure 9:
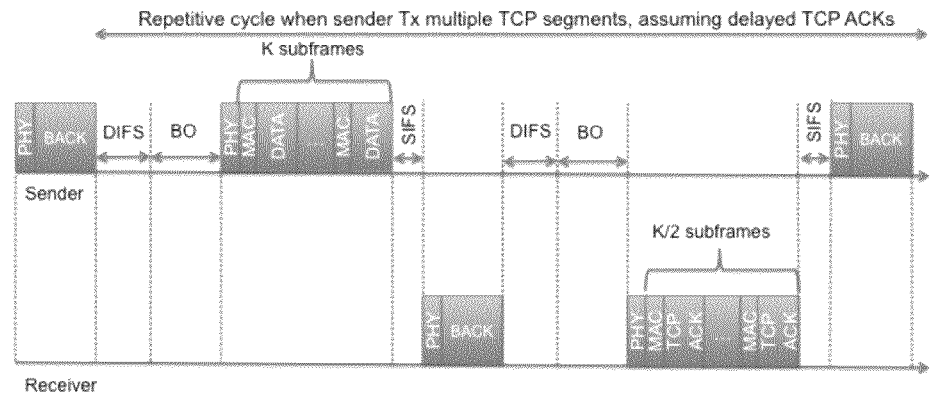
FIG. 9 depicts 802.11n MAC overhead in an A-MPDU transmission.

WQM can be divided into an initial stage and an adjustment stage. In the initial stage, WQM can select a starting buffer size. This size can be calculated based on a variation of the bandwidth delay product (BDP). The buffer size can be greater than or equal to product of the bottleneck link capacity with effective round-trip delay over that link. However, this rule was designed initially for wired networks and cannot be used directly in the 802.11n based networks as it does not account for A-MPDU frame aggregation. It is obvious that the transmission time, and hence RTT, for a single frame will be less than a single A-MPDU. Hence, the initial queuing delay can be calculated as:

$$Q_{initial} = R*ARTT \quad (1)$$

where $Q_{initial}$ is the initial queue size, R is the current Minstrel transmission rate, and ARTT is round-trip delay for a single A-MPDU transmission as illustrated in FIG. 9. A technique for calculating ARTT is described herein below.

The adjustment phase of WQM can come after assigning the initial buffer size. In this phase, the buffer size can be tuned to match the current network load. Every given period of time, the queueing delay is calculated using:

$$T_{drain} = \frac{B/R}{F} \quad (2)$$

where $T_{drain}$ is queue drain time, B is the queue backlog in bits, and F is the percentage of time the channel is free for the sender to transmit. The queue drain time is divided by the estimate of channel free time to account for the packet variable inter-service rate which is a property of any wireless network. For example, if there are three stations simultaneously contending for channel access, each of them will roughly be able to send around 33% of the time. Hence, the time to drain the queue is approximately three times higher compared to a case with only a single node transmitting. To synchronize WQM with the rate control algorithm, the same look-around interval of Minstrel, which is 100 ms, can be used. A period of 100 s can be sufficient to collect meaningful samples without wasting too many CPU cycles. This interval can also be sufficient to respond quickly to changes in channel conditions.

If the time to drain the queue $T_{drain}$ exceeds the predefined maximum limit for two consecutive periods, then this can be an indication that the buffer is bloated. As a result, the buffer size is decreased to limit the amount of buffering and hence limit the queuing delay. On the other hand, if $T_{drain}$ is lower than the limit for two consecutive periods, then the queue size can be increased. Observing the network statistics over two consecutive cycles before taking a corrective action can help account for temporary bursty traffic. The corrective action is taken only if the current queue size is within the allowable range i.e. $Q_{max} > Q > Q_{min}$. These queue size limits are further discussed and described hereinbelow.

Pseudo code can be useful in describing methods. In an exemplary embodiment, WQM can take the form of a method, and can include:

```
1   Set the maximum acceptable queuing delay limit
2   Calculate the initial Q_initial based on the current transmission rate R
    and the round trip delay for a single A-MPDU transmission ARTT:
3   Q_initial = R * ARTT
4   for every period seconds do
5     Calculate queue drain time T_drain based on the total number of bits
      in the queue B and the percentage of time the channel is not busy F
6         T_drain = B/R / F
7     Adjust the queue size Q based on whether the network is bloated
      or not
8     if T_drain > limit and Q > Q_min then
9       if alarm_high is ON then
10        decrease queue size Q
11      else
12        set alarm_high to ON and alarm_low is OFF
13    else if T_drain < limit and Q < Qmax then
14      if alarm_low is ON then
15        increase queue size Q
16      else
17        set alarm_low to ON and alarm_high is OFF
```

There have been insufficient attempts to address buffer sizing problems. For example, a technique, A*, that can adaptively tune AP buffers in single-hop wireless networks can be utilized. A* can use a ratio between maximum acceptable queuing delay and packet mean service rates to find the optimal buffer size. Such buffer sizes can be further tuned by monitoring buffer occupancy. See T. Li, D. Leith, and D. Malone, "Buffer sizing for 802.11-based networks," *IEEE/ACM Transactions on Networking*, vol. 19, no. 1, pp. 156-169, February 2011, which is incorporated by reference in its entirety. A limitation of the A* technique is that it is not be easily extended to support multi-hop scenarios, i.e. it general only can deal with an AP buffer. Moreover, to calculate packet service time, A* attaches a timestamp to each packets entering the queue, which is an overhead that can affect the overall network performance. The performance of the A* technique has not been evaluated using real 802.11n devices, and hence it is not clear how it would react to some enhancements such as frame aggregation.

Distributed Neighborhood Buffer (DNB) is a technique that can target the buffer sizing problem in wireless mesh networks (WMNs). See K. Jamshaid, B. Shihada, L. Xia, and P. Levis, "Buffer sizing in 802.11 wireless mesh networks," in *Mobile Adhoc and Sensor Systems (MASS)*, 2011 IEEE 8th International Conference on, October 2011, pp. 272-281, which is incorporated by reference in its entirety. In this technique, the network wide buffer size can be calculated and then distributed among a set of competing nodes based on a certain cost function with the goal of saturating the spectral resources available. Collectively sizing buffers in WMN nodes can lead to buffers as small as 1-3 packets at most mesh nodes. However, this approach can have limitations. First, it does not adapt to changes in link capacities; instead, it assumes fixed link rates and calculates the buffer sizes accordingly. Second, such small buffers can be incompatible with 802.11n frame aggregation. Finally, DNB is generally optimized to be used with single TCP flow. Hence, performance with multi flow scenarios is not guaranteed.

Recently, Jiang et al. focused on bufferbloat in cellular networks, see K. L. Haiqing Jiang, Yaogong Wang and I. Rhee, "Tackling bufferbloat in 3G/4G mobile networks," Dept. of Computer Science, North Carolina State University, Raleigh, N.C., USA, Tech. Rep. TR-2012-6, March 2012, which is incorporated by reference in its entirety. Dynamic Receive Window Adjustment (DRWA) can focus on bufferbloat in cellular networks. DRWA can modify a TCP stack instead of dealing with the buffer size directly. DRWA can limit the amount of buffering inside the network by tuning the size of the TCP receive window. This scheme can have practical limitations, for example, because of the large deployed base of TCP.

Various other techniques can be used, to greater or lesser success, to address the problem of wireless network buffer sizing. Tuning several AP parameters can be done to meet various application QoS as well as to ensure flow level fairness. One of the parameters, for example, can be queue size. See M. Thottan and M. C. Weigle, "Impact of 802.11e EDCA on mixed TCP-based applications," in *Proceedings of the 2nd annual international workshop on Wireless internet*, ser.

WICON '06, 2006. Bruno et al. suggested having large buffers at the AP to improve fairness in single-hop wireless networks, see R. Bruno, M. Conti, and E. Gregori, "Analytical modeling of TCP clients in Wi-Fi hot spot networks," in *Proc. of the IFIP Networking* '04, May 2004, pp. 626-637, which are incorporated by reference in its entirety. Having large buffers at the AP can potentially improve fairness in single-hop wireless networks by, for example, increasing the queuing delays for TCP ACKs to limit the rate of the upstream wireless sources. However, this can adversely impact various TCP dynamics, such as stability. Another scheme can include droping packets probabilistically when the size of the distributed neighborhood queue exceeds a certain threshold. For mobile ad hoc networks, the reduction of queue sizes on relay nodes to only one packet can be utilized to mitigate the problem of low throughput in multi-hop networks. See O. Dousse, "Revising buffering in CSMA/CA wireless multihop net-works," in *Proc. of the IEEE SECON* '07, June 2007, which incorporated by reference in its entirety. This can be infeasible for 802.11n networks with A-MPDU size of tens of subframes.

Design principles in WQM can include making minimal assumptions and taking decisions based on measured statistics. One of these statistics can be the current transmission rate. An implementation of WQM can utilize an off-the-shelf rate control manager, such as Minstrel for Linux Wireless, a default rate control algorithm in standard Linux distribution kernels. Minstrel relies on active measurements to select the appropriate link rate. The basic idea behind Minstrel is to search for the best rate by sending packets over fixed rates every 100 ms and decide which one to use based on the packet transmission success rate. The success rate can be calculated by dividing the amount of data transmitted by the time for a single try of one packet to be sent on the air. This can be then multiplied by the probability of successful transmission which is the percentage of packets sent successfully out of all packets sent in a given look around.

A method 100 for assigning buffer sizes to nodes of a wireless mesh network is illustrated in FIG. 1. The method 100 begins at block 102 with identifying a set of bottleneck nodes in a wireless mesh network. Wireless medium is a shared resource, which limits the set of wireless links that can be used concurrently. According to one embodiment, limiting links may be identified by determining an interference domain. The interference domain of a link $l_i$ may be defined as a set of all links that contend with link $l_i$.

Interference maps illustrating these relationships between various wireless links may be generated using passive or active measurement techniques. Passive measurements may be used when the network is under high load. Active measurement techniques may be used when the network is under low load. Active measurements may include an exchange of probe packets between test nodes. Interfering links exhibit a drop in their respective packet reception rates under concurrent transmissions. According to one embodiment, a two-hop interference model may be used to model a network and identify interfering links. Two links may interfere if they operate on the same channel and one endpoint of one link is within the transmission range of one endpoint of the other link. The two-hop model may approximate interference avoidance in a 802.11 network with request to send/clear to send (RTS/CTS) enabled.

Figure 2:
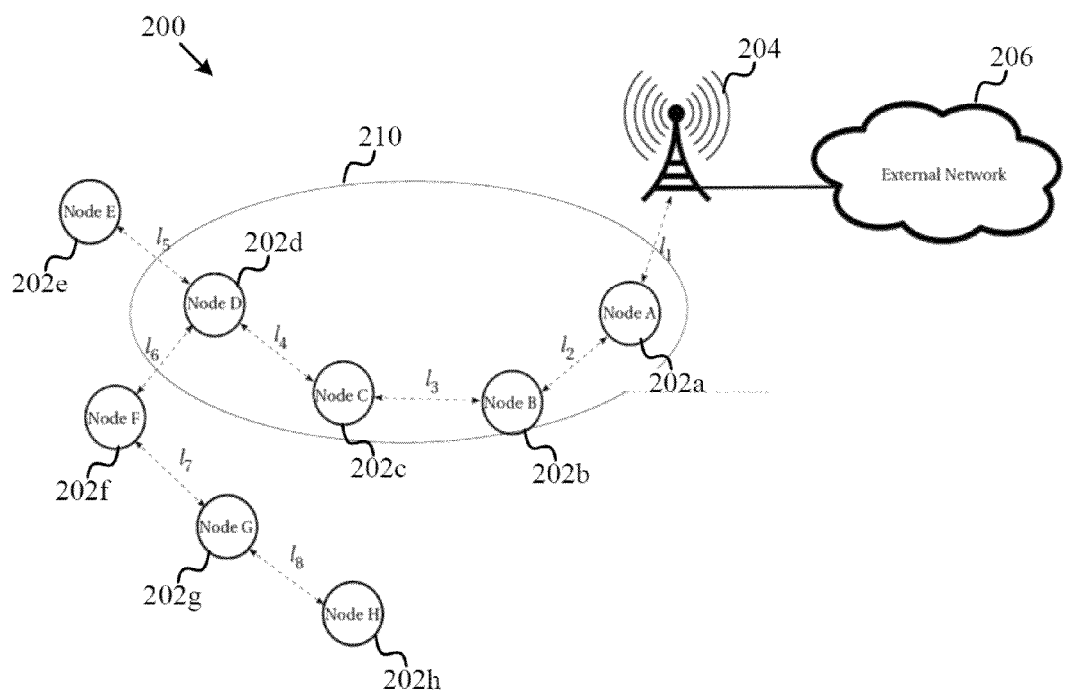
FIG. 2 is an illustration of an interference domain according to one embodiment of the disclosure.

FIG. 2 is an illustration of an interference domain according to one embodiment of the disclosure. A network 200 includes nodes 202*a-h*. The network 200 is coupled to an external network 206 through a gateway 204. A link $l_1$ couples the gateway 204 to the node 202*a*. A link $l_2$ couples the node 202*a* to the node 202*b*. A link $l_3$ couples the node 202*b* to the node 202*c*. A link $l_4$ couples the node 202*c* to the node 202*d*. A link $l_5$ couples the node 202*d* to the node 202*e*. A link $l_6$ couples the node 202*e* to the node 202*f*. A link $l_7$ couples the node 202*f* to the node 202*g*. A link $l_8$ couples the node 202*g* to the node 202*h*. An interference domain 210 of the link $l_3$ includes links $l_1, l_2, l_4, l_5$, and $l_6$. The interference domain 210 represents links that share wireless spectrum and are located such that a transmission on one link interferes with a transmission of another link. For example, in the interference domain 210, a transmission on link 12 by the node 202*a* to the node 202*b* operates on the same spectrum as transmission on link 14 between the node 202*c* and the node 202*d*. Additionally, the transmission intended only for link 12 is within detection limits by the nodes 202*d* and 202*c*, such that transmission on the link 12 interferes with transmission on the link 14.

A utilization of the interference domain 210 may be the sum total of transmission times for all the links $l_1$-$l_6$ in the interference domain 210. The sum may be represented mathematically as described below according to one embodiment of the disclosure. If R(m,n) is the link rate between neighboring nodes (m,n) and r(m,n) is the traffic carried by this link between neighboring nodes (m,n), and $r_i$ is the end-to-end rate for flow $f_i$ then $$r_{(m,n)} = \Sigma_{i:f_i traverses(m,n)} r_i.$$

If $I=\{I_1, I_2 \ldots I_j\}$ is the set of j interference domains in the network 200 and physical and MAC layer headers are ignored, then $$\Sigma_{\forall (m,n) in\ I_p} \frac{r_{(m,n)}}{R_{(m,n)}} \leq 1, \forall\ p \in \{1, 2, \ldots, j\}.$$

i.e., the utilization of an interference domain (defined as the sum total of transmission times of constituent links) cannot exceed 1 for all interference domains in the network.

The interference domain 210 may become saturated when the spectrum is fully utilized. A saturated interference domain may be a bottleneck for a data flow if that data flow has a maximal rate among all other flows using the saturated interference domain. A multi-hop data flow may be part of one or more interference domains. The data flow's end-to-end rate may then be bound by the interference domain that assigns it the lowest rate.

Referring back to FIG. 1, at block 104 a cumulative buffer size is calculated. A cumulative buffer may be configured to fully utilize the spectral resource in the bottleneck interference domain to reduce constraints on the end-to-end rate of a multi-hop data stream. According to one embodiment, spectral resource utilization may be improved when the nodes 202*a-f* in the bottleneck interference domain 210 always have packets to send. A packet transmission by any one of the nodes 202*a-f* may fully utilize the available spectral resource shared by the nodes 202*a-f* in the interference domain 210 for the duration of the transmission. Thus, each node may be considered when assigning a buffer size to each of the nodes 202*a-f*.

Figure 3:
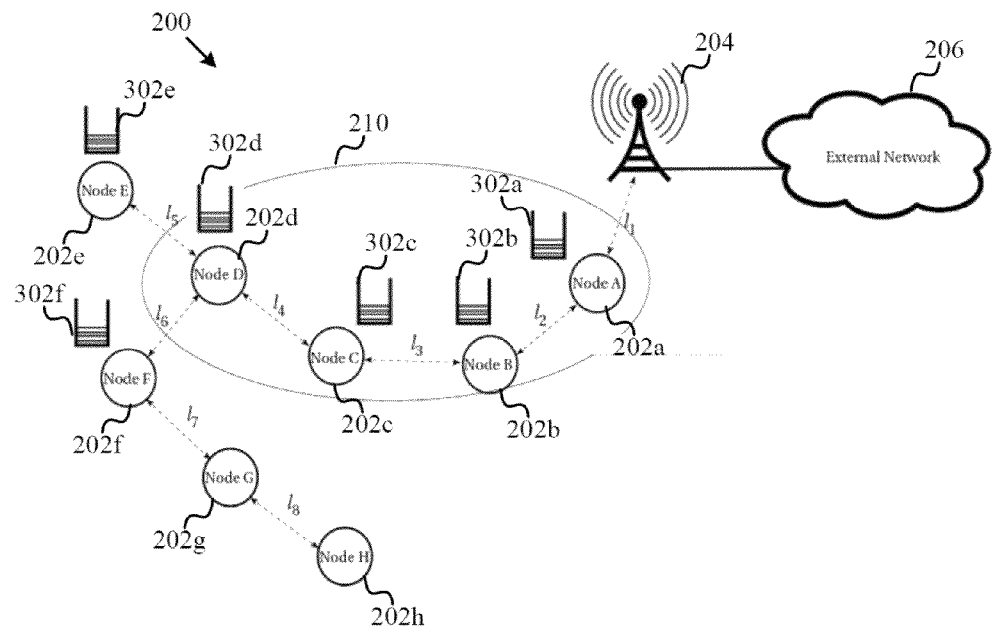
FIG. 3 is a block diagram illustrating a wireless mesh network with a cumulative buffer set for nodes in an interference domain according to one embodiment of the disclosure.

This cumulative buffer size may be the sum of the buffer space at all the constituent nodes. The cumulative buffer utilization may be the aggregate backlog at the constituent nodes. The cumulative buffer packet arrival rate may be the sum of the arrival rates at individual nodes. FIG. 3 is a block diagram illustrating a wireless mesh network with a cumulative buffer set for nodes in an interference domain according to one embodiment of the disclosure. However, this cumulative buffer does not exhibit the first in, first out (FIFO) characteristics due to distributed queues and stochastic CSMA/CA scheduling. A cumulative buffer may be distributed in the buffers 303a-303f of the nodes 202a-f in the bottleneck interference domain 210.

According to one embodiment, the utilization of bottleneck spectrum may be enhanced by setting the bottleneck cumulative buffer arbitrarily large such that it will always have sufficient packets in queue to saturate the bottleneck, even when the traffic source is stalled trying to recover from signs of network congestion (e.g., a packet loss). However, if this buffer is larger than a rate supported by the network, the buffer may increase queuing delay without increasing the end-to-end flow rate. If the bottleneck is under-buffered, its spectral resource may not always be fully utilized.

A multi-hop wireless data stream may be transmitted over a network having a maximum rate of $\lambda$ packets/seconds. The one-way propagation delay through the bottleneck interference domain may be d seconds. In an uncongested network, propagation delay may be dominated by transmission delays (with little or no queuing delays) along the multi-hop wireless links. The round-trip time (RTT) through the bottleneck may be RTT=2d.

According to one embodiment, the mesh network may have real-time traffic streams transmitted across links of the network. When the mean arrival rate for the real-time traffic stream is $\mu$ packets/second at the bottleneck interference domain and a given source-destination pair, this bottleneck may support traffic at a maximum rate of $\lambda$ packets/second. The bottleneck interference domain cumulative buffer size may be computed as B≥$\lambda$d. Those skilled in the art will realize that the description uses packets instead of bits or bytes simply for ease of exposition.

When $\mu$≥$\lambda$, the buffer size B may reduce queuing delays by dropping excess traffic before the traffic consumes the spectral resource of the interference domain. Over a time period, these packet drops may invoke a higher layer decision at the source node to reduce rate. For example, a VoIP client may switch from a high bit-rate codec to a low bit-rate codec to adapt to network settings.

When $\mu$≤$\lambda$, a cumulative buffer computed from B≥$\lambda$d may be implemented in the interference domain to improve utilization of capacity in the interference domain when the network implements a random scheduling protocol such as CSMA/CA.

According to another embodiment, the mesh network may have bursty traffic streams, such as backlogged TCP streams, transmitted across links of the network. Assuming the stream is in an AIMD congestion avoidance phase, the TCP window size may reach a value of $W_{max}$ packets before experiencing a loss. Thus, the sender may halve the window size to $W_{max}/2$ packets. Since the window size limits the number of unacknowledged packets in transit, the sender, on average, waits for a time interval $$\frac{w_{max}/2}{\lambda}$$

before starting to retransmit. During this time, the distributed buffer B takes B/$\lambda$ seconds to drain. The source may start retransmitting before the buffer is fully drained to increase utilization of the bottleneck spectrum such that $$\frac{w_{max}/2}{\lambda} < B/\lambda \text{ or } B > \frac{w_{max}}{2}.$$

When the TCP source starts retransmitting, the source rate may be equal to or higher than $\lambda$ to provide for full utilization of the bottleneck capacity. Thus $$\frac{w_{max}/2}{RTT} \geq \lambda, \text{ or, } \frac{w_{max}}{2} \geq \lambda \times RTT.$$

Thus, B≥$\lambda$×RTT.

In multi-hop wireless networks, $\lambda$ may be limited by the bottleneck interference domain. Values for $\lambda$ and RTT may be based, in part, on the network topology and wireless channel characteristics. According to one embodiment, these values may be periodically measured and recorded. According to another embodiment, approximation strategies may be used to determine $\lambda$ and RTT to reduce overhead in measuring and recording values. For example, upper bounds on $\lambda$ and RTT may be estimated. Using an upper bound on these values may size the distributed buffer B larger than the instantaneously precise BDP. This may be beneficial to account for the time-varying capacity of the wireless channel, and non-deterministic 802.11 distributed coordination function (DCF) scheduling. The resulting larger buffer trades-off queuing delay for higher channel utilization.

Referring back to FIG. 1, at block 106 the cumulative buffer is distributed among the bottleneck nodes. Once the cumulative buffer size B is computed, the cumulative buffer may be distributed among the set of nodes 202a-f in the bottleneck collision domain 210. According to one embodiment, B may be equally divided between the nodes 202a-f. Equally dividing the buffer may be simple to implement. According to another embodiment, the cumulative buffer may be distributed between the nodes 202a-f according to a cost function. For example, one cost function may consider that a queue drop closer to the source has consumed fewer network resources than a queue drop near the destination.

Figure 4:
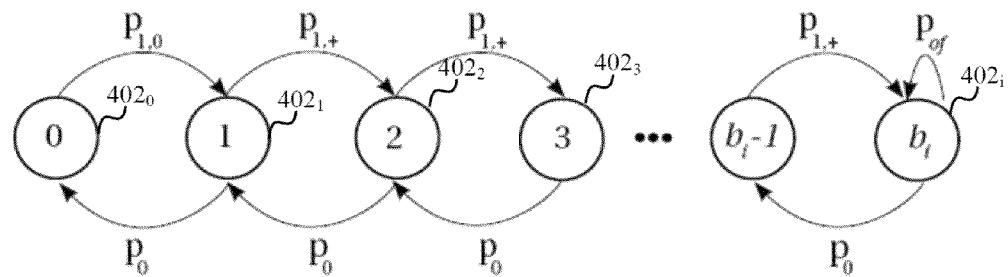
FIG. 4 is a state diagram illustrating the queue occupancy state transition for a mesh node according to one embodiment of the disclosure.

FIG. 4 is a state diagram illustrating the queue occupancy state transition for a mesh node according to one embodiment of the disclosure. A node $n_i$ may have a queue capacity of $b_i$ packets corresponding to its allocated buffer. $\pi_k$ may represent the steady state probability that the node queue size is k, for 0≤k≤$b_i$. In particular, $\pi_0$ and $\pi_{bi}$ may represent the probabilities that the buffer is empty or full, respectively. A node may transmit a packet with probability $p_0$ and transition to a state with one less packet queued. With probability $p_{1,+}$, a relay node receives a packet from its parent in the routing tree, and then queues it locally for transmission to the next hop. The transition probability $p_{1,0}$ is a special case for packet reception when the current queue size is zero. Finally, probability $p_{of}$ represents a packet drop due to buffer overflow.

A node may begin at state 402$_0$ with no packets buffered at the node. The node may advance to state 402$_1$ with some probability $p_{1,0}$, the probability the node receives a packet for relay when the buffer is empty. The node may return to state 402$_0$ with some probability $p_0$ that a successful transmission occurs. From the state 402$_1$ the node may advance to 402$_2$, or more generally 402$_i$, with some probability $p_{1,+}$ that the node receives a packet for relay that is then queued for transmission. When the node is in state 402$_i$ the node remains at state 402$_i$ until a packet is successfully transmitted with some probability $p_0$. Additionally, there is some probability $p_{of}$ that the node receives a packet and remains at the state $402_i$ because the buffer is full.

The buffer at a node overflows when a node in state $402_i$ receives a packet. Thus, $p_{of} = \pi_{b_i} \times p_{1,+}$. The cost associated with this drop due to network resources already consumed by this packet may increase with the hop distance of $n_i$ from the source along the routing path. For example, a packet dropped closer to source wastes fewer network resources compared to a packet dropped closer to destination. When the nodes $n_i$ are ordered such that they represent an increasing hop distance from the source, the index i for i={1, 2, . . . ,M}, where M is the number of nodes in the interference domain, may be implemented as a simple cost function to represent the bias associated with a packet drop at node $n_i$.

According to one embodiment, the cumulative buffer may be distributed according to the following constraints:

$$\min_{b_i} \Sigma_{i=1}^{M} \pi_{b_i} \times p_{1,+} \times i,$$

subject to $\Sigma_{i=1}^{M} b_i = B$ and $b_i \geq 0, \forall i \in M$.

This cost function may be solved either analytically or using any of a number of software packages commonly used in solving sets of equations. In one example, the analysis may result in small buffers at individual mesh routers.

The cumulative buffer size may be distributed throughout the buffers 302a-f of the wireless mesh network 200 by providing in each node a processor configured to determine the node's buffer size. According to one embodiment, the processor in each node 202a-f may calculate the portion of the cumulative buffer size that should be assigned to the node. The node then configures its own buffer with the corresponding size. According to another embodiment, the processor of one of the nodes 202a-f in the interference domain 210 may compute buffer sizes for each of the nodes 202a-f and transmit the buffer size assignments to each of the other nodes. The processor of each of the other nodes would then be configured its buffer size in accordance with instructions received over the network 200.

Referring back to FIG. 1, at block 108 the mesh network is monitored for changes. For example, monitoring the network may include detecting changes in a bottleneck capacity. The cumulative buffer size for the bottleneck and the subsequent buffer sizes for each node are based on the bottleneck interference domain characteristics, including the bottleneck capacity and delay. These characteristics may change over time. For example, a 802.11 ad hoc network may use adaptive link rates to increase or decrease wireless link capacities based on the transmit power control, channel noise, and/or interference from other network nodes. These characteristics may be monitored over time. When a change is detected, a new cumulative buffer may be computed for the bottleneck interference domain 210, which may then be used to assign buffer space to individual nodes 202a-f.

At block 110 if changes in the network are detected the method 100 returns to block 102 and repeats the blocks 102, 104, 106, 108, and 110. If no changes are detected at block 110 the method 100 returns to monitoring the network at block 108 until changes are detected.

In an embodiment, loose upper and lower bounds for the queue size Q and the maximum allowed queuing delay limit can be predetermined. To find an upper bound on the queue size, Qmax, an 802.11n network with a sender transmitting a single TCP stream to a receiver can be considered. Assume that the maximum possible transmission rate is $\lambda$ packets/s.

Assuming that the stream is in the TCP congestion avoidance phase, the TCP congestion window can grow until it reaches $W_{max}$ when a packet loss happens. As a result, the sender halves its TCP congestion window. Hence, it waits for $$\frac{W_{max}/2}{\lambda}$$

before going to the transmit phase again. The queue Q drain time is $Q/\lambda$ s. An ideal scenario can be to have the sender transmitting just before the buffer empties to make sure the link is fully utilized, i.e.

$$\frac{W_{max}/2}{\lambda} \leq \frac{Q}{\lambda}, \text{ or,}$$

$$Q \geq \frac{W_{max}}{2} \quad (3)$$

Also, to maintain full link utilization, sender TCP transmission rate (i.e. cwnd/ARTT) should be at least $\lambda$. Hence.

$$\frac{W_{max}/2}{ARTT} \geq \lambda, \text{ or, } \frac{W_{max}}{2} \geq ARTT \cdot \lambda \quad (4)$$

From Eqn. (3) and (4), $$Q \geq \lambda \cdot ARTT \quad (5)$$

As per Eqn. (5), the maximum queue size, $Q_{max}$, is equal to the bandwidth delay product using the maximum possible transmission rate and the corresponding packet round-trip time. ARTT can represent the transmission delay, as in wireless networks propagation delay, and can be negligible.

FIG. 9 shows the MAC overhead of a single A-MPDU transmission over an 802.11n network. The TCP segment transmission time $T_{d\text{-}DATA}$ and the TCP ACK transmission time $T_{d\text{-}ACK}$ can be calculated as per Eqns. 6 and 7 respectively.

$$T_{d\text{-}DATA} = T_{BO} + T_{DIFS} + 2 \cdot T_{PHY} + T_{SIFS} + T_{BACK} + K \cdot (T_{MAC} + T_{DATA}) \quad (6)$$

$$T_{d\text{-}DATA} = T_{BO} + T_{DIFS} + 2 \cdot T_{PHY} + T_{SIFS} + T_{BACK} + K/2 \cdot (T_{MAC} + T_{TCP\text{-}ACK}) \quad (7)$$

The system parameters for the used 802.11n network are listed in Table 1. $T_{BO}$ is the backoff interval in case the channel is found to be busy. Based on both MAC contention window and slot duration $T_{slot}$, the average backoff time can be calculated as $T_{BO} = CW \times T_{slot}/2$. The shortest inter-frame space is $T_{SIFS}$ and the distributed inter-frame space is $T_{DIFS}$. $T_{DATA}$ and $T_{MAC}$ are aggregate frame and MAC header transmission time, respectively. A single A-MPDU can contain K TCP segments, potentially as large as 64 kB or a total of 64 segments whichever is smaller, each with its own MAC header. Hence, a transmission duration of $K \times (T_{DATA} + T_{MAC})$ is added per A-MPDU. The TCP ACK transmission time is $T_{TCP\text{-}ACK}$ whereas $T_{BACK}$ is the time to transmit a MAC-level block ACK frame. Assuming that TCP delayed acknowledgement is used, only K=2 frames are acknowledged. $T_{PHY}$ is the transmission duration of both PHY preamble and header. In case the TCP flow traverses over M multiple hop, ARTT can be calculated as follows:

$$ARTT = \sum_{i=1}^{M} T_{d-DATA} + T_{d-ACK} = M \cdot (T_{d-DATA} + T_{d-ACK})$$

The maximum queue size is needed when the sender transmits with the highest possible $T_x$ rate, 600 Mb/s for IEEE 802.11n, and all frames are sent with maximum A-MPDU length, i.e. K=64 subframes. The delay for transmitting an A-MPDU with maximum length and its block ACK (per the exchange shown in FIG. 9) over a single hop is about 1.9 ms at 600 Mb/s link rate. According to Eqn. 5, the upper bound on the queue size Qmax should be 95 packets over a single hop network, 190 packets over a two-hops network and so on. As a lower bound, the minimum queue size $Q_{min}$ should be equal to the maximum A-MPDU length allowed by the link rate. This is because permitting the queue size to be smaller than the number of subframes in a single A-MPDU will result in sending shorter aggregates which in turn affects the network throughput negatively.

TABLE I

| Parameter | Value |
| --- | --- |
| $T_{slot}$ | slot time = 9 μs |
| $T_{SIFS}$ | shortest inter-frame space = 16 μs |
| $T_{DIFS}$ | distributed inter-frame space = 34 μs |
| $T_{PHY}$ | PHY preamble and header time = 33 μs |
| $CW_{min}$ | minimum contention window size = 15 |
| $CW_{max}$ | maximum contention window size = 1023 |

TABLE II

| | Default | | WQM | |
| --- | --- | --- | --- | --- |
| Flows | Thr (Mb/s) | RTT (ms) | Thr (Mb/s) | RTT (ms) |
| 1-flow | 155.7 | 61.51 | 134.35 | 13.10 |
| 2-flows | 78.43 | 65.80 | 69.21 | 13.47 |
| 3-flows | 51.96 | 420.66 | 45.77 | 14.19 |
| 4-flows | 39.22 | 213.19 | 33.96 | 14.91 |
| 5-flows | 31.38 | 937.36 | 27.41 | 14.93 |

TABLE III

| Num. of flows | Default (1000 packets) | WQM |
| --- | --- | --- |
| 2 | 0.99 | 0.99 |
| 3 | 0.70 | 0.99 |
| 4 | 0.89 | 0.99 |
| 5 | 0.69 | 0.99 |

TABLE IV

| | Default | | WQM | |
| --- | --- | --- | --- | --- |
| Flows | Thr (Mb/s) | RTT (ms) | Thr (Mb/s) | RTT (ms) |
| 1-flow | 33.92 | 306.45 | 34.26 | 48.83 |
| 2-flows | 16.975 | 336.60 | 16.93 | 50.61 |
| 3-flows | 11.30 | 346.90 | 11.36 | 51.5 |
| 4-flows | 8.33 | 359.82 | 8.42 | 52.2 |
| 5-flows | 6.68 | 362.07 | 6.70 | 53.27 |

TABLE V

| | Default | | WQM | |
| --- | --- | --- | --- | --- |
| Flows | Thr (Mb/s) | RTT (ms) | Thr (Mb/s) | RTT (ms) |
| 1-flow | 68.32 | 169.44 | 61.08 | 33.76 |
| 2-flows | 34.52 | 165.30 | 32.10 | 35.32 |
| 3-flows | 22.89 | 177.09 | 20.40 | 38.83 |
| 4-flows | 17.66 | 186.29 | 15.94 | 38.55 |
| 5-flows | 13.76 | 193.47 | 12.54 | 38.20 |

A loose lower bound on the allowed queuing delay limit can be computed. For 802.11n networks using frame aggregation, the maximum allowable A-MPDU size varies with the link rate. Consider a wireless channel with high interference where the rate control algorithm chooses to transmit at the lowest possible data rate (6.5 Mb/s for 802.11n radios). As per the ath9k aggregation implementation logic, A-MPDU aggregation is disabled when transmitting at 6.5 Mb/s. As a result, limits should be greater than or equal to the transmission time of one frame at the lowest possible rate. As per Eqns. 6 and 7, limit should be greater than or equal to 2.5 ms. In one embodiment, the limit=2.5 ms can allow for significant reductions in latency while preserving overall network throughput.

In an exemplary embodiment, WQM can be implemented using a Linux working environment. One, non-limiting, embodiment can be implemented with a plurality of computers. The computers can be equipped with wireless network hardware, for example TP-Link WDN4800 (Atheros AR9380), which is a dualband (2.4/5 GHz), 3-stream MIMO 802.11n wireless card with a maximum link rate of 450 Mb/s. An otherwise utilized or non-utilized radio band can be chosen for implementation, for example, the 5 GHz U-NII (Unlicensed National Information Infrastructure) radio band could be used to avoid interference with certain campus production networks. Nodes can be placed certain distances apart, for example 10 m apart. In an exemplary embodiment, a standard 3.9.10 Linux kernel with a web10g patch can be patched, for example, to monitor various TCP statistics. Standard drivers, such as the ath9k driver with Minstrel, can be utilized for rate control. TCP Cubic can be used, the default TCP version on the stock Linux. To simulate a large file transfer, netperf can be used (Netperf, http://www.netperf.org/netperf/). It can generate TCP streams with 1448 bytes segments with the total maximum segment size (MSS) of 1500 bytes as additional 20 bytes can be added for TCP header, 10 bytes for TCP timestamp, and 20 bytes for IPv4 header and 2 bytes for padding.

In an exemplary embodiment, a WQM implementation can use a conservative approach in which queue sizes grow linearly in response to measurements. When required by the algorithm, queue sizes can be decreased, by half for example, to make sure the network latency remains bounded. For multiple flows, the average flow throughput and delay results are listed in Table II. For a single flow, WQM can reduce the network latency by around five timex (i.e. 5×) compared to a 1000-packets buffer at a cost of approximate 13% reduction in throughput. WQM can maintain a low round-trip delay with increasing number of flows, while the default buffer sizes result in high latency. This can be attributed to the unfairness between the flows. Table III lists the Jain's Fairness Index (JFI) value for both the default scheme and WQM. It is clear that large buffers can lead to severe unfairness as one or more flows fill up the buffers quickly while starving others. WQM can prevent those flows from doing so by limiting the queue size to the actual needed value.

Figure 10:
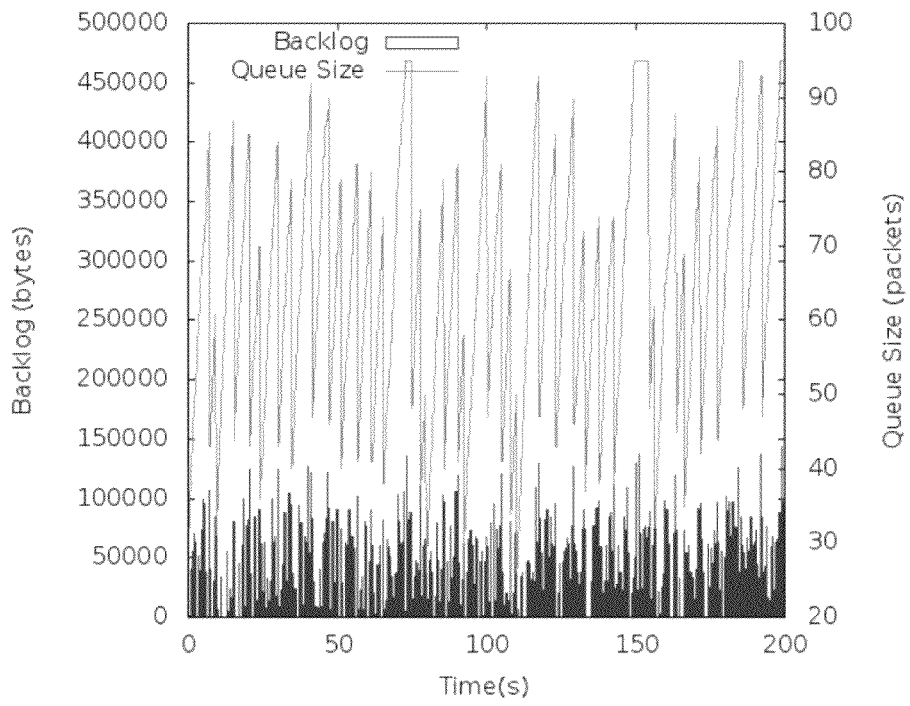
FIG. 10 depicts a queue size adaptation in response to a queue occupancy variation for the 5 file transfers.

FIG. 10 shows WQM queue size variation with five flows. It is clear from this figure that the queue size needed to maintain high throughput is much lower than the Linux default value. It also shows that fixing the buffer size to a static low value is not feasible as the network load can change and the buffer needed should change accordingly.

Figure 11:
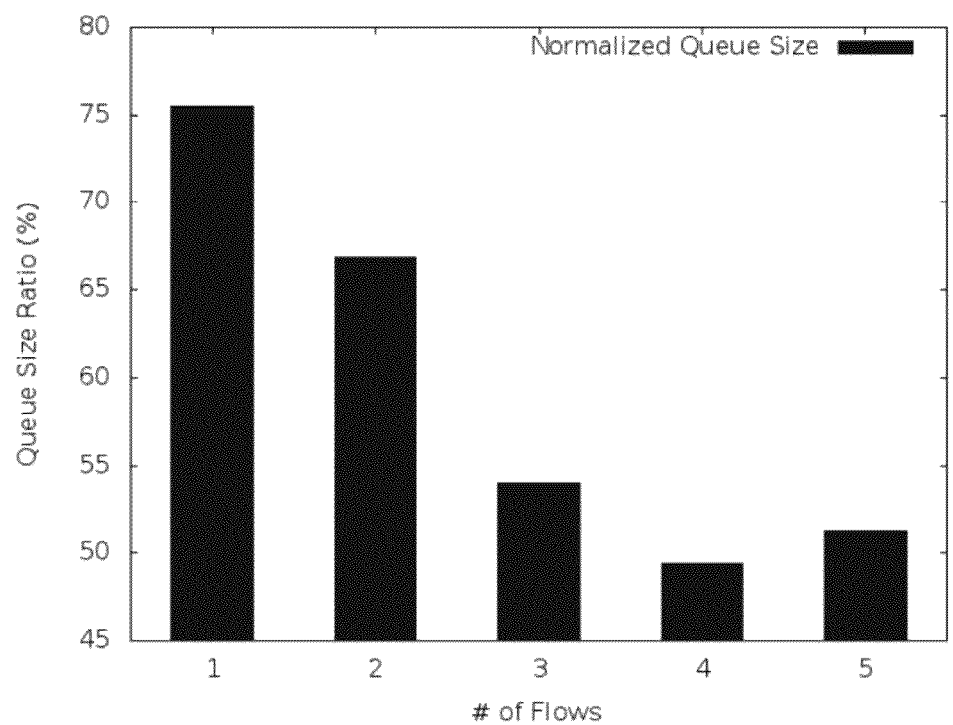
FIG. 11 depicts averaged queue sizes of in an exemplary WQM embodiment for various concurrent flows.

802.11n standard specifications require backward compatibility with 802.11a/b/g devices. In this case, 802.11n device does not use frame aggregation. To test this scenario, the previous set of results have been repeated while disabling A-MPDU aggregation. The average per flow throughput and RTT is listed in Table IV. Compared to the default case with 1000 frames queue size, WQM can achieve a six times (i.e. 6×) reduction in latency while having similar throughput. The ratio of queue size with A-MPDU disabled to the queue size with A-MPDU enabled is shown in FIG. 11 for various numbers of flows in the network. As expected, the average queue size with A-MPDU enabled can be larger than when it is disabled for all the scenarios. This is generally because A-MPDU can allow the sender to send using higher rates. Hence, WQM can allow the queue to be larger as it is going to be drained faster. Even if the 802.11n network is not in a green field deployment, i.e. the network is not solely composed of 802.11n devices, WQM can still control the network latency.

The performance of various WQM embodiments has also been evaluated in multi-hop wireless networks. For example, over a two-hop network, i.e. packets are queued twice before reaching their destinations, results are shown in Table V. As discussed above, the transmission time for a single A-MPDU will be twice as much in this case, and hence the maximum allowable queue size will be twice also. For various numbers of flows, WQM can reduce RTT by a factor of five (i.e. 5×) with the cost of a 10% drop in throughput in the worst case.

Figure 12:
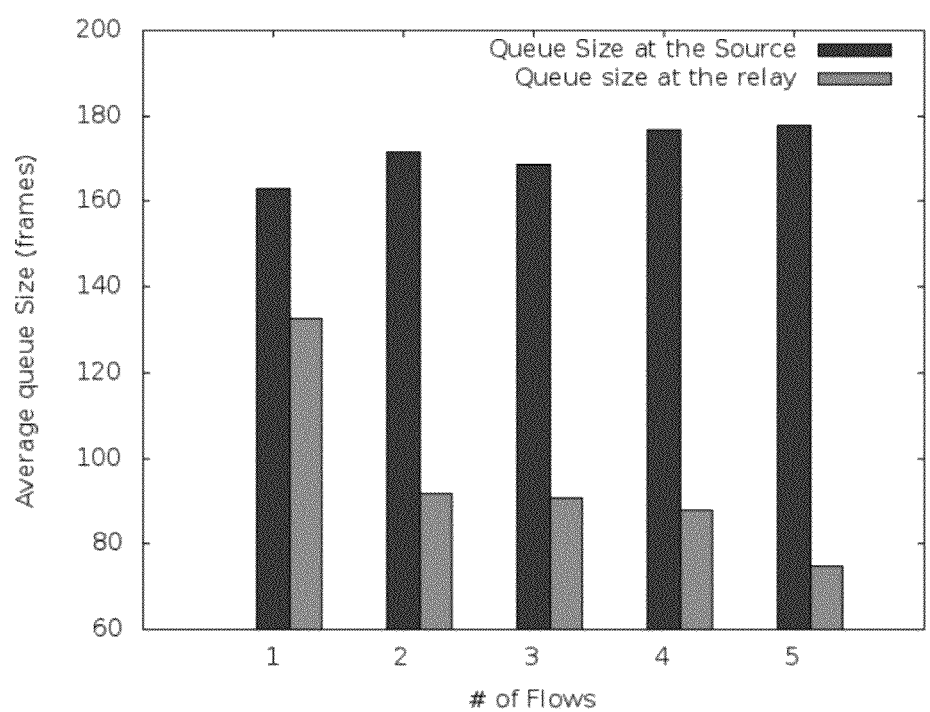
FIG. 12 depicts exemplary WQM queue size variation over 2 hops in response to network load changes.

FIG. 12 shows the average queue length assigned by WQM at both the source and the relay queue. As the number of competing flows increases, the average queue size at the source increases to try to accommodate the additional bandwidth required. The average queue size at the relay decreases since competing flows back off randomly when they find the channel is busy.

Figure 5:
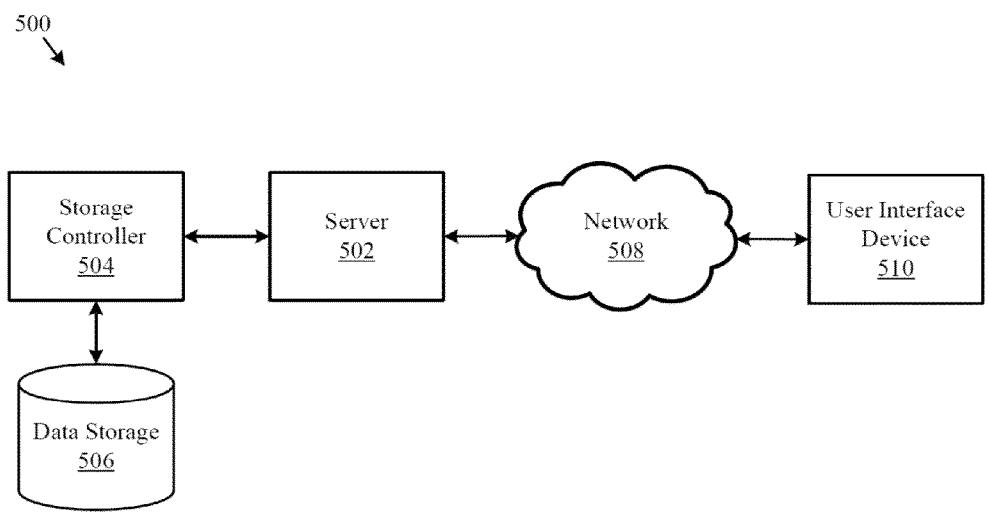
FIG. 5 is block diagram illustrating a data management system configured to store databases, tables, and/or records according to one embodiment of the disclosure.

FIG. 5 illustrates one embodiment of a system 500 for an information system incorporating a network such as the wireless mesh network described in the embodiments above. The system 500 may include a server 502, a data storage device 506, a network 508, and a user interface device 510. The server 502 may be a dedicated server or one server in a cloud computing system. In a further embodiment, the system 500 may include a storage controller 504, or storage server configured to manage data communications between the data storage device 506, and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or table computer, a smart phone or other a mobile communication device or organizer device having access to the network 508. In a further embodiment, the user interface device 510 may access the Internet or other wide area network (WAN) or local area network (LAN) through a wireless mesh network to access a web application or web service hosted by the server 502 and provide a user interface for enabling a user to enter or receive information.

The network 508 may facilitate communications of data between the server 502 and the user interface device 510. The network 508 may include any type of communications network including, but not limited to, a multi-hop wireless mesh network, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

Figure 6:
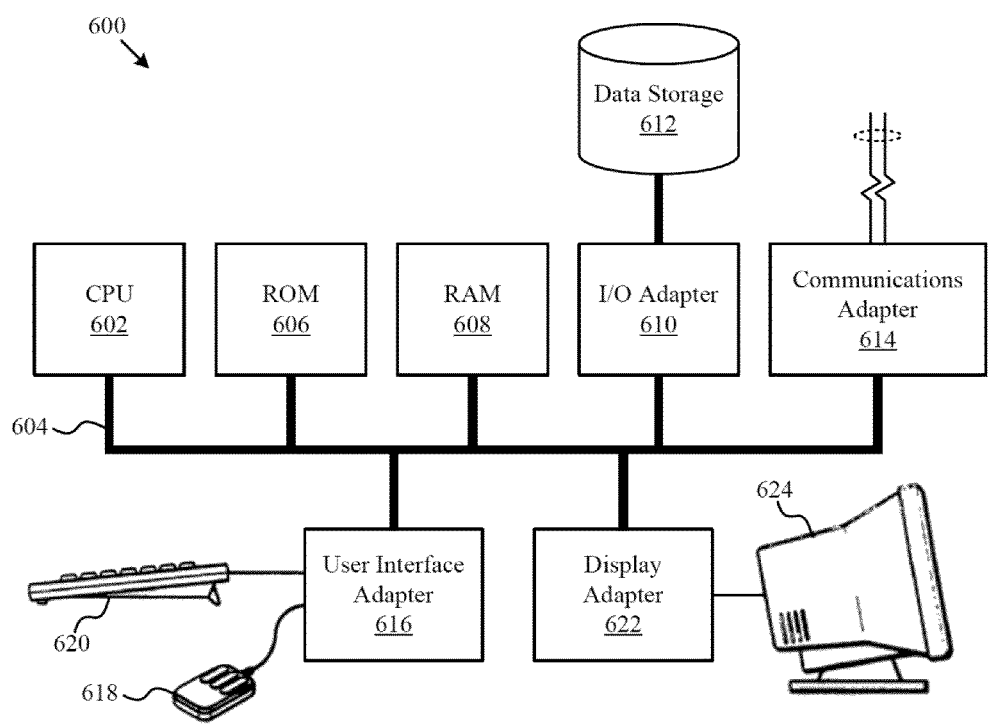
FIG. 6 is a block diagram illustrating a computer system according to one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, support the modules and operations as described herein. The CPU 602 may execute the various logical instructions according to the present embodiments.

The computer system 600 also may include random access memory (RAM) 608, which may be SRAM, DRAM, SDRAM, or the like. The computer system 600 may utilize RAM 608 to store the various data structures used by a software application such as databases, tables, and/or records. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface associated with a software or web-based application on a display device 624, such as a monitor or touch screen.

The I/O adapter 610 may connect one or more storage devices 612, such as one or more of a hard drive, a compact disk (CD) drive, a floppy disk drive, and a tape drive, to the computer system 600. The communications adapter 614 may be adapted to couple the computer system 600 to the network 408, which may be one or more of a LAN, WAN, and/or the Internet. The communications adapter 614 may be adapted to couple the computer system 600 to a storage device 612. The user interface adapter 616 couples user input devices, such as a keyboard 620, a pointing device 618, and/or a touch screen (not shown) to the computer system 600. The display adapter 622 may be driven by the CPU 602 to control the display on the display device 624.

The applications of the present disclosure are not limited to the architecture of computer system 600. Rather the computer system 600 is provided as an example of one type of computing device that may be adapted to perform the functions of a server 502 and/or the user interface device 510. For example, any suitable processor-based device may be utilized including, without limitation, personal data assistants (PDAs), tablet computers, smart phones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The schematic flow chart diagrams of FIGS. 1 and 4 are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

The various techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

In one implementation, a general-purpose computer can have an internal or external memory for storing data and programs such as an operating system (e.g., DOS, Windows 2000™, Windows XP™, Windows NT™, OS/2, iOS, UNIX or Linux) and one or more application programs. Examples of application programs include computer programs implementing the techniques described herein, authoring applications (e.g., word processing programs, database programs, spreadsheet programs, simulation programs, engineering programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer or Google Chrome) capable of rendering standard Internet content and other content formatted according to standard protocols such as the Hypertext Transfer Protocol (HTTP), HTTP Secure, or Secure Hypertext Transfer Protocol.

One or more of the application programs can be installed on the internal or external storage of the general-purpose computer. Alternatively, in another implementation, application programs can be externally stored in or performed by one or more device(s) external to the general-purpose computer.

The general-purpose computer includes a central processing unit (CPU) for executing instructions in response to commands, and a communication device for sending and receiving data. One example of the communication device is a modem. Other examples include a transceiver, a communication card, a satellite dish, an antenna, a network adapter, network interface card, mobile internet device, or some other mechanism capable of transmitting and receiving data over a communications link through a wired or wireless data pathway.

The general-purpose computer can include an input/output interface that enables wired or wireless connection to various peripheral devices. Examples of peripheral devices include, but are not limited to, a mouse, a mobile phone, a personal digital assistant (PDA), a smartphone, a tablet computer, a keyboard, a display monitor with or without a touch screen input, and an audiovisual input device. In another implementation, the peripheral devices can themselves include the functionality of the general-purpose computer. For example, the mobile phone or the PDA can include computing and networking capabilities and function as a general purpose computer by accessing the delivery network and communicating with other computer systems. Examples of a delivery network include the Internet, the World Wide Web, WANs, LANs, analog or digital wired and wireless telephone networks (e.g., Public Switched Telephone Network (PSTN), Integrated Services Digital Network (ISDN), or Digital Subscriber Line (xDSL)), radio, television, cable, or satellite systems, and other delivery mechanisms for carrying data. A communications link can include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, solid state drive, or flash memory devices including memory cards, USB flash drives, solid-state drives, etc. The removable storage drive reads from or writes to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as can be found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between the computer system and external devices. Examples of communications interfaces can include a modem, a network interface (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in main memory or secondary memory. Computer programs can also be received via a communications interface. Such computer programs, when executed, enable the computer system to perform the features as discussed herein. In particular, the computer programs, when executed, enable the processor to perform the described techniques. Accordingly, such computer programs represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, causes the processor to perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software.

In another embodiment, the computer-based methods can be accessed or implemented over the World Wide Web by providing access via a Web Page to the methods described herein. Accordingly, the Web Page is identified by a Universal Resource Locator (URL). The URL denotes both the server and the particular file or page on the server. In this embodiment, it is envisioned that a client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol or HTTP). The selected page is then displayed to the user on the client's display screen. The client can then cause the server containing a computer program to launch an application to, for example, perform an analysis according to the described techniques. In another implementation, the server can download an application to be run on the client to perform an analysis according to the described techniques.

The following references are hereby wholly incorporated by references.

J. Gettys and K. Nichols, "Bufferbloat: dark buffers in the internet," Commun. ACM, vol. 55, no. 1, pp. 57-65, January 2012.

T. Li, D. Leith, and D. Malone, "Buffer sizing for 802.11-based networks," IEEE/ACM Transactions on Networking, vol. 19, no. 1, pp. 156-169, February 2011.

K. Jamshaid, B. Shihada, L. Xia, and P. Levis, "Buffer sizing in 802.11 wireless mesh networks," in Mobile Adhoc and Sensor Systems (MASS), 2011 IEEE 8th International Conference on, October 2011, pp. 272-281.

K. L. Haiqing Jiang, Yaogong Wang and I. Rhee, "Tackling bufferbloat in 3G/4G mobile networks," Dept. of Computer Science, North Carolina State University, Raleigh, N.C., USA, Tech. Rep. TR-2012-6, March 2012.

M. Thottan and M. C. Weigle, "Impact of 802.11e EDCA on mixed TCP-based applications," in Proceedings of the 2nd annual international workshop on Wireless internet, ser. WICON '06, 2006.

R. Bruno, M. Conti, and E. Gregori, "Analytical modeling of TCP clients in Wi-Fi hot spot networks," in Proc. of the IFIP Networking '04, May 2004, pp. 626-637.

K. Xu, M. Gerla, L. Qi, and Y. Shu, "Enhancing TCP fairness in ad hoc wireless networks using neighborhood RED," in Proc. of the ACM MobiCom '03, September 2003, pp. 16-28.

O. Dousse, "Revising buffering in CSMA/CA wireless multihop net-works," in Proc. of the IEEE SECON '07, June 2007.

D. Smithies and F. Fietkau, Minstrel Rate Control Algorithm. [Online]. Available: wireless.kernel.org/en/developers/Documentation/mac80211/RateControl/minstrel IEEE LAN/MAN Standards Committee, IEEE 802.11 Wireless LAN medium access control (MAC) and physical layer (PHY) specifications, IEEE, 2012.

C. Villamizar and C. Song, "High performance TCP in ANSNET," SIGCOMM Comput. Commun. Rev., vol. 24, no. 5, pp. 45-60, October 1994.

Other embodiments are within the scope of the following claims.

What is claimed is:

1. A wireless network node comprising:
a wireless network antenna;
a processor in communication with the wireless network antenna; and
a non-transitory computer readable medium containing computer-executable code instructing the processor to:
calculate an initial buffer size;
adjust the initial buffer size to a current buffer size based on a current network load; and
wherein the wireless network node has a transmission rate, and wherein the initial buffer size is the multiplicative product of the transmission rate and a round-trip delay for a single protocol data unit transmission.

2. The wireless network node of claim 1, wherein the processor is further configured to determine a queue drain time and to calculate a predefined maximum queue drain time and a predefined minimum queue drain time.

3. The wireless network node of claim 2, wherein the processor is further configured to re-adjust the current buffer size based on a determination that the queue drain time is outside the maximum queue drain time and the predefined minimum queue drain time for at least two consecutive periods.

4. A method of managing wireless queues, comprising:
calculating an initial buffer size based on a round-trip delay for a single protocol data unit transmission and a transmission rate; and
adjusting the initial buffer size to a current buffer size based on a current network load.

5. The method of claim 4, wherein the initial buffer size is greater than or equal to a determined bandwidth delay product of a bottleneck link capacity.

6. The method of claim 4, further comprising:
determining a queue drain time; and
calculating a predefined maximum queue drain time and a predefined minimum queue drain time.

7. The method of claim 6, further comprising:
re-adjusting the current buffer size based on a determination that the queue drain time is greater than the maximum queue drain time or less than the predefined minimum queue drain time for at least two consecutive periods.

8. A method for managing wireless queues in a network, comprising:
setting a maximum acceptable queuing delay limit;
calculating an initial queue size, $Q_{initial}$, wherein $Q_{initial}$ is based on a current transmission rate, R, and a round trip delay for a single protocol data unit transmission, ARTT, and wherein $Q_{initial} = R*ARTT$; and
calculating a current queue size, Q.

9. The method of claim 8, further comprising:
periodically calculating a queue drain time, $T_{drain}$, in a channel based on the total number of bits in the current queue size, B, and the percentage of time the channel is not busy, F, and wherein $$T_{drain} = \frac{B/R}{F}.$$

10. The method of claim 9, further comprising:
adjusting Q based on whether the network is bloated.

11. A method comprising:
providing a plurality of nodes in a wireless network compatible with at least one wireless network standard, each of the plurality of nodes having a buffer with an initial assigned size;
actively measuring at least one link characteristics and network load;
adaptively adjusting buffer size of each node based on the measured link characteristics and network load;
calculating a queueing delay between two nodes;
decreasing the buffer size if the queueing delay exceeds a predefined maximum limit for two consecutive predefined time periods; and
calculating a minimum allowed queueing delay, in which the queueing delay is greater than or equal to a transmission time of one frame at a lowest rate.

12. The method of claim 11, further comprising:
periodically recalculating time needed to drain each node's buffer based on a current transmission rate, wherein the current transmission rate is one measured link characteristics.

13. The method of claim 11, further comprising selecting an optimized link rate between two nodes based on the measured link characteristics.

14. The method of claim 13, further comprising selecting for the optimized link rate by sending at least two packets over fixed rates by a certain time interval.

15. The method of claim 14, in which the optimized link rate is calculated by dividing an amount of data transmitted by a single try of one packet.

16. The method of claim 11, further comprising calculating a queueing delay between two nodes.

17. The method of claim 11, further comprising increasing the buffer size if the queueing delay is lower than a predefined maximum limit for two consecutive predefined time periods.

18. The method of claim 11, further comprising calculating a maximum buffer size as a product of a maximum packet transmission rate and a corresponding packet round-trip time.

19. A computer program product comprising a non-transitory computer readable medium comprising:
code to identify a plurality of nodes in a wireless network compatible with at least one wireless network standard, each of the plurality of nodes having a buffer with an initial assigned size;
code to actively measure at least one link characteristics and network load;
code to adaptively adjust buffer size of each node based on the measured link characteristics and network load;
code to periodically recalculate time needed to drain each node's buffer based on a current transmission rate, wherein the current transmission rate is one measured link characteristics;
code to select an optimized link rate between two nodes based on the measured link characteristics;
code to calculate a queueing delay between two nodes; and
code to calculate a minimum-allowed queueing delay, in which the queueing delay is greater than or equal to a transmission time of one frame at a lowest rate.

20. The computer program product of claim 19, further comprising: code to periodically recalculate time needed to drain each node's buffer based on a current transmission rate, wherein the current transmission rate is one measured link characteristics; and code to select an optimized link rate between two nodes based on the measured link characteristics.

21. The computer program product of claim 19, further comprising code to select the optimized link rate by sending at least two packets over fixed rates by a certain time interval, in which the optimized link rate is calculated by dividing an amount of data transmitted by a single try of one packet.

22. The computer program product of claim 19, further comprising code to decrease the buffer size if the queueing delay exceeds a predefined maximum limit for two consecutive predefined time periods; and code to increase the buffer size if the queueing delay is lower than a predefined maximum limit for two consecutive predefined time periods.

23. The computer program product of claim 19, further comprising code to calculate a maximum buffer size as a product of a maximum packet transmission rate and a corresponding packet round-trip time.

* * * * *